May 14, 1968   J. ULDERUP   3,383,129
UNIVERSAL JOINT CONSTRUCTION
Filed June 15, 1966

INVENTOR.
JÜRGEN ULDERUP
BY
McGlew & Toren
ATTORNEYS.

United States Patent Office 3,383,129
Patented May 14, 1968

1

3,383,129
UNIVERSAL JOINT CONSTRUCTION
Jürgen Ulderup, Bergstrasse, Lemforde,
Hannover, Germany
Filed June 15, 1966, Ser. No. 557,666
Claims priority, application Germany, July 24, 1965,
U 11,912
9 Claims. (Cl. 287—88)

ABSTRACT OF THE DISCLOSURE

A universal joint construction includes a pivotal ball to joint member having a central spherical portion and a pin portion extending outwardly from each end. The joint includes a housing for the ball joint member which comprises a one piece disk of relatively hard plastic material which surrounds the ball portion and provides a spherical surface on which the ball is pivotal. The construction also includes a packing disk of a soft material which is capable of being impregnated with lubricant which is arranged at each side of the hard plastic material and has an inner edge in sealing engagement with the spherical portion of the ball member.

---

Figure 1:
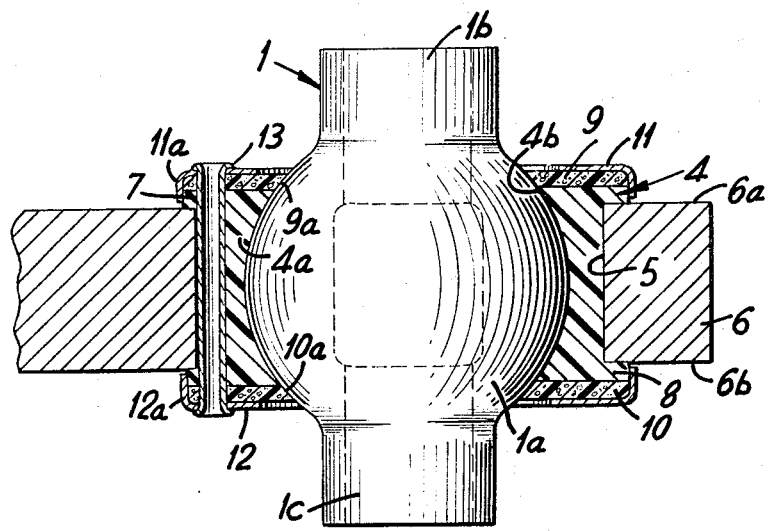

This invention relates in general to the construction of universal joints and in particular to a new and useful universal joint particularly for steering suspensions of motor vehicles which includes a plastic insert forming a housing for a ball portion of a pivotal joint member and which includes end packing disks made of soft elastic material which are held together at each end of the insert such as by rivets.

Plastic swivel joints or universal joints are known which include a ball joint member which carries journals or pins on both sides and which is pivotally mounted within a metal housing. In some instances the housing is also provided with an elastic insert for cushioning the operation of the joint. A device of this nature usually includes a housing which is connected in a known manner with a connecting linkage by welding or similar methods or even made integral with the end portion of the connecting linkage by being formed as an integral mold part. There are many disadvantages in the practical operation of such joints, however. Either the known joints do not permit major angular movement so that they are not suitable for wide range application, or the sealing of the joint housing against the penetration of dirt and water is not satisfactory. In addition, the known joints are of rather complicated construction so that the manufacture of individual parts and their assembly is rather expensive.

In accordance with the present invention, there is provided a universal joint construction which includes an insert housing member for mounting the ball portion of the pivotal joint member which is made of a one-piece cylindrical formation of an elastic material such as polyurethane, polyamide or superpolyamide. The housing is provided with a spherical central cavity portion in which the ball member of the pivot pin is pivotally arranged. Cylindrical end disks of soft elastic packing material close each end of the housing member and bear against the end portions of the ball member in sealing engagement. The construction further advantageously includes holding rings which are arranged over the packings and have down-turned portions which extend over flanged portions of the insert housing member which are defined at each end thereof. Holding rings are advantageously held to the housing insert by means of rivets which, in the preferred arrangement, will extend through the linkage member mounting the housing insert.

The housing insert is made of a hard elastic plastic material and is of one-piece design and provided with flanges which engage over each end of the mounting member or connecting link. The insert housing is of a construction so that it merely encloses the spherical portion of the hinge pin and thus provides end openings at each end for the passage of the hinge pin journal portion. The construction permits the housing insert to perform different functions at the same time. It provides a bearing for the spherical part of the hinge pin which meets the high requirements necessary to permit easy sliding movement of the ball member with abrasion resistance and self-adjustability when subjected to occurring steering or other forces. Because the insert is a molded single piece double flanged bushing, it is easy to shape and form and no machining is necessary. The use of hard elastic plastic in combination with the shaping of the insert with double flanges which engage around the link member makes it further possible to replace the previously required special joint housing which is made of metal. The construction requires only a connecting linkage member with a bore defined therein of a size for receiving the housing insert in a manner such that the flanges extend over each surface of the link member. The use of the disk packing element of soft elastic material permits a reliable sealing at each end of the ball member. The inner end of the soft elastic packing disks is provided with a bevel adapted to the spherical form of the joint member so that a tight seal is achieved. A further feature of the construction is that the packing disks are advantageously made of a foam material so that the cells may be impregnated with lubricant to maintain the joints well lubricated at all times. The packing disks may be easily cemented to the end faces of the hard elastic insert so that no additional holding elements are essential. However, it is also possible to employ additional sheet metal holding rings for securing the packings which may advantageously be connected in the joint construction such as by rivets, screws, etc., which, in the preferred form, will extend through bores defined in the holding link.

Accordingly it is an object of the invention to provide an improved universal joint construction which includes a housing for a pivotal link member having a central ball with pin journals at each end which housing includes an insert made of a hard elastic material having flanges which are adapted to fit around each surface of a holding link and which further includes a packing disk at each end which is adapted to bear closely against the spherical ball portion of the link member in sealing engagement therewith.

A further object of the invention is to provide a linkage made of a central hard plastic material forming a seat for a ball portion of a hinge pin and with end disk members of a packing material made of a foam plastic having pores which contain lubrication for lubricating the ball portion of the joint in its pivotal movement within the hard elastic insert housing.

A further object of the invention is to provide a universal joint which is simple in design, rugged on construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
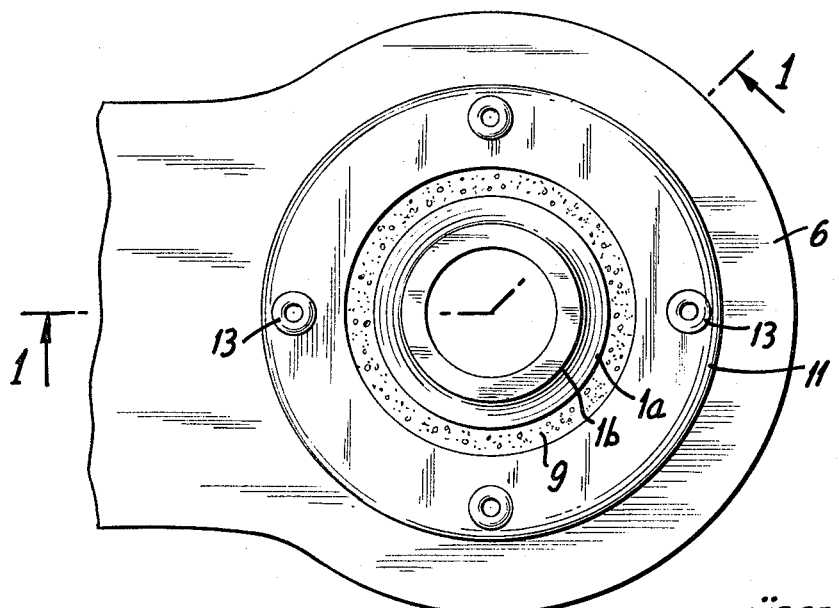

In the drawings:

FIG. 1 is a sectional view taken along the line 1—1 of FIG. 2 of a universal joint constructed in accordance with the invention; and FIG. 2 is a top plan view of the joint indicated in FIG. 1.

Referring to the drawings in particular, the invention embodied therein comprises a universal joint including a pivot pin member generally designated 1 which includes a central spherical or ball-shaped portion 1a and end pin or journal portions 1b and 1c.

In accordance with the invention, the ball pin member 1 is rotatably supported at its ball portion 1a on a connecting linkage or link member 6 by means of a housing insert or joint housing generally designated 4. The housing insert 4 comprises a molded insert 4a of a hard elastic polyurethane plastic material of cylindrical shape and having low frictional characteristics permitting easy sliding of the ball portion 1a and provided with flanges at each end which overlie surfaces 6a and 6b, respectively, of the link 6. The insert housing 4 is arranged within a cylindrical bore 5 of the linkage 6 and due to the elastic flexibility of the material, the insert can be forced easily therein without any damage using a suitable tool. After insertion, the insert will assume the position indicated in FIG. 1 in which projecting flange portions 7 and 8, respectively, overlie the surfaces 6a and 6b, respectively.

In accordance with a feature of the invention, soft elastic plastic disk members or packing elements 9 and 10 are arranged over each flanged end of the insert and they include bevelled edges 9a and 10a which are arranged in close bearing contact with the ball portion 1a of the pivot pin member 1. A feature of the construction is that the soft disks are advantageously made of a foam plastic having open cells which are advantageously impregnated with a lubricant to provide for lubrication of the ball portion to permit it easily to be moved backwardly and forwardly in the hemispherical recess 4b of the insert housing member.

With the preferred arrangement, the packing elements 9 and 10 are retained in position by means of metal rings 11 and 12 which include downturned end portions 11a and 12a, respectively, which extend around the respective flanged ends 7 and 8. The metal rings 11 and 12 are advantageously held in position by means of rivets or connecting screws or bolts which, in a preferred arrangement, extend through the linkage member 6. The rivets are advantageously made of brass. In the embodiment illustrated, the rivets 13 extend into longitudinal grooves (not shown) of the housing insert 4 and through corresponding counter grooves arranged in the bore 5 of the linkage member 6.

While a specific embodiment of the invention has been shown and described in detail to illustrate the application of the inventive principles, it will be understood that the invention may be embodied otherwise without departing from such principles.

What is claimed is:

1. A universal joint construction comprising a pivotal ball joint member having a central spherical portion and a pin portion extending outwardly from each end, a cylindrical one-piece insert housing of relatively hard plastic material enclosing a portion of the spherical portion of said pivotal ball member and providing a segmental spherical surface on which said ball member is pivotal, and a packing disk arranged on each end of said insert housing and having an inner edge in sealing engagement with the spherical portion of said pivotal ball joint member, said insert housing having a widened flange portion at each end, said packing disk being secured to each flange portion of said insert housing by adhesive.

2. A universal joint according to claim 1, including a metal securing ring extending over the packing disk on each side of said insert housing member, and means for securing the rings on opposite ends of said insert housing together.

3. A universal joint construction according to claim 2, wherein said means for securing said rings together include a rivet extending through said insert housing and through said packing disks and said rings.

4. A universal joint construction comprising a pivotal ball joint member having a central spherical portion and a pin portion extending outwardly from each end, a cylindrical one-piece insert housing of relatively hard plastic material enclosing a portion of the spherical portion of said pivotal ball member and providing a segmental spherical surface on which said ball member is pivotal, a packing disk arranged on each end of said insert housing and having an inner edge in sealing engagement with the spherical portion of said pivotal ball joint member, a link member having a bore, said insert housing being disposed in said bore and including flange portions on each side of greater dimension than said bore bearing against the respective opposite faces of said link member, a clamping ring extending over each packing disk and around the end of the flange of said insert housing, and rivet means riveting said clamping rings together.

5. A universal joint construction according to claim 4, wherein said rivet means extend through said insert housing.

6. A universal joint construction according to claim 5, wherein said packing disks are made of open cell plastic material and including lubrication in the cells of said packing disks.

7. A universal joint construction comprising a pivotal ball joint member having a central spherical portion and a pin portion extending outwardly from each end, a cylindrical one-piece insert housing of relatively hard plastic material enclosing a portion of the spherical portion of said pivotal ball member and providing a segmental spherical surface on which said ball member is pivotal, and a packing disk which is made of foam material having open cells arranged on each end of said insert housing and having an inner edge in sealing engagement with the spherical portion of said pivotal ball joint member.

8. A universal joint construction comprising a pivotal ball joint member having a central spherical portion and a pin portion extending outwardly from each end, a uniformly cylindrical one-piece insert housing of a relatively hard plastic material enclosing a portion of the spherical portion of said pivotal ball member and providing a segmental spherical surface in which said ball member is pivotal, and a substantially annular packing disk of a soft open cellular material capable of being impregnated with lubricant secured to each end of said insert housing so as to provide lubricant reservoirs and having an inner edge in sealing engagement with the spherical portion of said pivotal ball joint member to exclude foreign matter from the joint; a link member having a bore, said insert housing being disposed in said bore and including flange portions on each side of greater dimension than said bore bearing against the respective opposite faces of said link member.

9. A universal joint construction according to claim 8, wherein the inner edge of each of said packing disks is bevelled corresponding to the spherical formation of the spherical portion of said pivotal ball joint member.

(References on following page)

References Cited

UNITED STATES PATENTS

| | | | |
|---|---|---|---|
| 2,271,511 | 2/1942 | Doughty | 308—72 |
| 2,304,595 | 12/1942 | Prentice | 308—72 |
| 2,758,365 | 8/1956 | Ricefield | 29—149.5 |
| 2,814,538 | 11/1957 | Connolly | 308—72 |
| 3,004,786 | 10/1961 | Herbenar | 287—90 |
| 3,025,090 | 3/1962 | Langen | 287—87 |
| 3,068,031 | 12/1962 | Herbenar et al. | 287—90 |

FOREIGN PATENTS

| | | |
|---|---|---|
| 1,366,571 | 6/1964 | France. |
| 1,367,980 | 6/1964 | France. |

CARL W. TOMLIN, *Primary Examiner.*

ANDREW V. KUNDRAT, *Assistant Examiner.*